Figure 1:
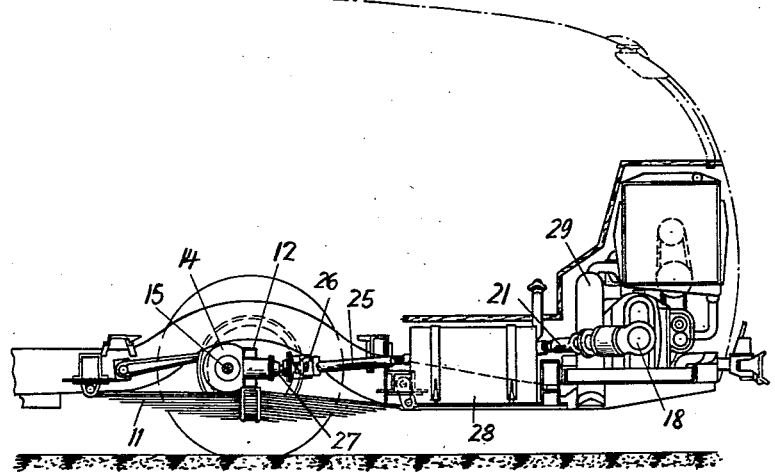

March 19, 1957  E. STUMP  2,785,763
VEHICLE DRIVE SHAFT ARRANGEMENT BETWEEN POWER PLANT AND AXLE
Filed Feb. 18, 1952

Inventor
Eugen Stump
By Dickard Padlow
ATTORNEYS

United States Patent Office 2,785,763
Patented Mar. 19, 1957

2,785,763

VEHICLE DRIVE SHAFT ARRANGEMENT BETWEEN POWER PLANT AND AXLE

Eugen Stump, Stuttgart-Unterturkheim, Germany, assignor to Daimler-Benz Aktiengesellschaft, Stuttgart-Unterturkheim, Germany Application February 18, 1952, Serial No. 272,067

Claims priority, application Germany February 17, 1951

6 Claims. (Cl. 180—54)

The present invention relates to a driving device for motor vehicles, particularly omnibuses, with a driven shaft member, which is staggered to a driving shaft member and is arranged at an angle, preferably for transmission of the drive from the engine to the vehicle axle gear.

One object of the present invention is above all to obtain an unobjectionable drive transmission, which is in spite of the angular staggering of the shaft members as steady as possible.

A further object is a particularly advantageous utilization of the space, which is available on the vehicle.

It is a further object of the present invention to drive the axle in the usual manner through a central axle gear in spite of a driven end of engine or gear, which is staggered laterally to the longitudinal central plane of the vehicle, without necessitating an additional bevel gear transmission in the axle gear for this purpose.

A further object of the present invention is a good accessibility of the driving aggregate and an advantageous weight-distribution balance of the aggregates on the vehicle.

An essential feature of the present invention consists accordingly in the fact that the drive transmission, for example from the engine or gear connection, which is arranged laterally in the vehicle, to the axle gear is mediated by a shaft line, which—seen in plan view—takes the course of a bend and consists of several single parts, i. e. the shaft line accordingly runs out substantially tangential into one of the subsequent shafts.

According to a further feature of the present invention the single shafts are each connected by Cardan joints, in such a manner that the axes of successive single shafts form obtuse angles, which are substantially equal among each other.

According to a further feature of the present invention the engine is arranged transversely to the direction of motion, particularly at the vehicle end with driving connection, which is located on one side of the vehicle, and with a universal-joint shaft, which returns in an acute angle to the crankshaft axis, while the axle gear is preferably arranged in the longitudinal central plane of the vehicle with a driving shaft, which runs in direction of motion of the vehicle.

In the drawing an embodiment of the invention is represented, i. e.

Figure 2:
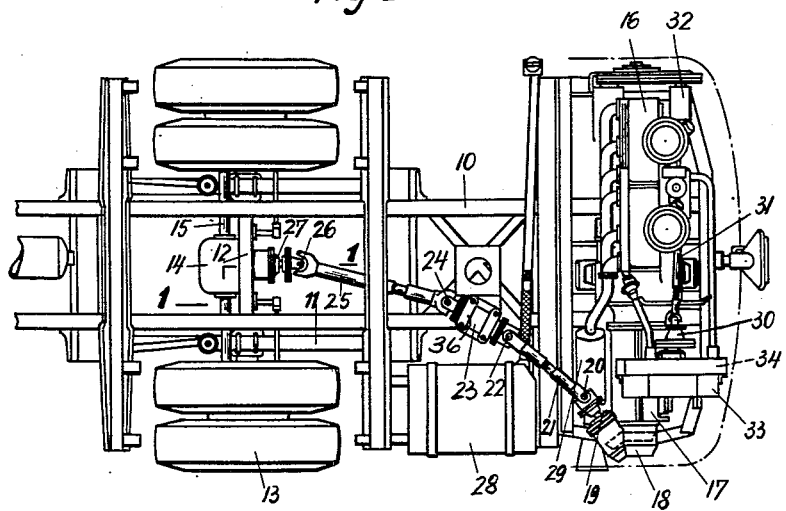

Fig. 1 shows the side view partially in section through the (for example rear) vehicle end of an omnibus and Fig. 2 shows a plan view on the undercarriage according to Fig. 1.

Referring now more particularly to the drawing wherein like reference numerals are used throughout the various views to designate like parts, reference numeral 12 designates the rear axle for the driven rear wheels 13. The axle 12 is fastened to the frame 10 which consists, for example, of conventional longitudinal and cross members, by means of leaf springs 11 to enable vertical spring movements of the axle 12 relative to the frame 10. The axle 12 is formed in the center part thereof in an annular manner so as to form a raised part. Axle gear 14 is inserted into the annular part of rear axle 12 by means of an axle gear casing projection, which accommodates the axle gear shaft member 27, while the wheels 13 are driven from the axle gear 14 by means of drive shafts 15.

The drive aggregate or drive unit is formed by an engine 16 which is located at the rear end of the vehicle at a substantial distance from the axle gear 14 and disposed transversely thereat, and by a change-speed gear disposed in the casing 17. The change-speed gear drives a driving shaft member 19 suitably supported in the casing 18 by means of a pair of bevel-gear wheels which are arranged in the casing 18, the latter forming a part of the change-speed gear casing 17. The axis of the shaft member 19 forms an acute angle with the axis of the crankshaft of the engine so that the drive is thereby reversed in direction from the output of the change-speed gear at an acute angle with respect to the crankshaft of the engine, as seen in a plan view.

The driving shaft member 19 drives a transmitting shaft member 21 by means of the universal joint or a cardan joint 20. The transmitting shaft member 21 in turn drives intermediate shaft member 23 by means of universal joint 22. The intermediate shaft member 23 is supported at the frame in any conventional manner, for example, by means of a bearing bracket 36 which supports the shaft 23 at the vehicle frame. The shaft 23 in turn is connected with a transmitting shaft member 25 by means of a universal joint 24, while the transmitting shaft member 25 is connected with the axle gear or driven shaft member 27 by means of a universal joint 26. The transmitting shaft members 21 and 25 are of substantial length.

As seen in a plan view the shafts 19, 21, 23 and 25 are thereby arranged with respect to each other at an obtuse angle so that they form a shaft line which extends in an arched manner and which terminates essentially tangentially into the axle gear shaft member 27 which is arranged in the longitudinal central plane of the vehicle. The intersections of the axes of successive shaft members 21, 23, 25 and 27 in the direction away from the driving shaft member 19 form increasingly larger angles with the axis of the driving shaft member 19.

The shaft line formed by shaft members 21, 23, 25 and 27 thereby bypasses a fuel tank 28 which is arranged laterally in the vehicle.

The exhaust system for the engine 29 is guided below the shaft line to the side of the vehicle. An auxiliary drive casing 30 is connected with the change-speed gear casing 17. The auxiliary drive casing 30 accommodates an auxiliary drive which drives one or several drive aggregates 32, for example, a compressor, fuel pumps or the like by means of an auxiliary shaft member 31 which extends below or behind the engine 29 in parallel or approximately parallel to the crankshaft of the engine. The radiator 33 is arranged above the change-speed gear casing 17 at one end of the engine 29 transversely to the direction of movement of the vehicle and ahead of the fan 34.

The present invention is not limited to the embodiment illustrated herein. For example, the engine, instead of being disposed in the transverse direction, may also be disposed in the longitudinal direction to one side of the vehicle, whereby, for example, two engines may also be provided, one on each side of the longitudinal central plane of the vehicle which are associated with the same or different axles. Furthermore the engine, instead of being located at the rear end, may also be located at the front end of the vehicle or possibly also in a center part of the vehicle. In addition thereto, one or several axles may be driven by the same driving aggregate.

What I claim is:

1. A driving device for motor vehicles comprising a vehicle frame, an axle member having at least a pair of wheels, means for springily supporting said axle member against said frame for movement in a vertical direction, a driving shaft member, means rigidly connected with said vehicle frame for supporting said driving shaft member, an intermediate non-parallel shaft member displaced with respect to said driving shaft member at a constant angle within a substantially horizontal plane, means rigidly connected with said vehicle frame for supporting said intermediate shaft member, a non-parallel driven shaft member disposed in the center part of said axle member and displaced at a constant angle with respect to said intermediate shaft member, the intersection of the axis of said driven shaft member with the axis of said driving shaft member forming a larger angle than the intersection of the axes of said intermediate shaft member and said driving shaft member, a transmitting shaft member of substantial length between said driving shaft member and said intermediate shaft member and another transmitting shaft member of substantial length between said intermediate shaft member and said driven shaft member, and universal joint means at both ends of each of said transmitting shaft members for connecting said transmitting shaft members with said driving shaft member, said intermediate shaft member and said driven shaft member respectively, said shaft members forming an arcuate line in a substantially horizontal plane.

2. In a motor vehicle a vehicle frame, a driving aggregate disposed laterally on said frame including laterally disposed means for the transmission of the drive comprising a diagonally disposed driving shaft member, axle gear means located substantially in the center of the vehicle and disposed substantially in the longitudinal direction of said vehicle at a substantial distance from said driving aggregate, means for springily supporting said axle gear means against said frame, a driven shaft member for said axle gear means substantially located in the longitudinal direction of said vehicle, an intermediate shaft member located in a substantially horizontal plane and displaced at a constant angle with respect to the axes of said two first-mentioned shaft members in a horizontal plane, means rigidly connected with said frame for supporting said intermediate shaft member, one transmitting shaft member of substantial length each between said driving shaft member and said intermediate shaft member and between said intermediate shaft member and said driven shaft member respectively, and universal joint means on both ends of said transmitting shaft members for connecting said transmitting shaft members with said driving shaft member, said intermediate shaft member and said driven shaft member respectively, said shaft members forming an arcuate shaft line in a substantially horizontal plane with the intersection of the axes of successive shaft members in the direction away from said driving shaft member with the axis of said driving shaft member forming increasingly greater angles.

3. A driving device according to claim 2, wherein the shaft members are arranged in such a manner that each two adjacent shaft members form an obtuse angle which is substantially constant.

4. In a motor vehicle the combination according to claim 2, wherein the driving aggregate, consisting of engine and change-speed gear, is arranged transversely to the direction of motion of the vehicle.

5. In a motor vehicle the combination according to claim 2, wherein the driving aggregate is arranged substantially transversely to the driving direction at one end of the vehicle.

6. In a motor vehicle, the combination according to claim 2, further comprising a casing-like accessory part disposed on the same vehicle side as said driving shaft member and disposed in the longitudinal direction of the vehicle so that said accessory part is encircled in an arcuate manner by said shaft line.

References Cited in the file of this patent

UNITED STATES PATENTS

| | | |
|---|---|---|
| 379,030 | Robes | Mar. 6, 1888 |
| 1,993,912 | Austin | Mar. 12, 1935 |
| 2,096,541 | Haltenberger | Oct. 19, 1937 |
| 2,254,452 | Ronning | Sept. 2, 1941 |
| 2,384,092 | Hollos | Sept. 4, 1945 |
| 2,391,971 | Hollos | July 1, 1946 |
| 2,514,071 | Jusky | July 4, 1950 |

FOREIGN PATENTS

| | | |
|---|---|---|
| 728,820 | France | July 12, 1932 |
| 776,457 | France | Jan. 26, 1935 |
| 922,416 | France | June 9, 1947 |
| 26,101 | Great Britain | of 1904 |